May 4, 1954
R. H. DAVIES ET AL
2,677,475
INDUSTRIAL TRUCK
Filed Sept. 20, 1951
3 Sheets-Sheet 1
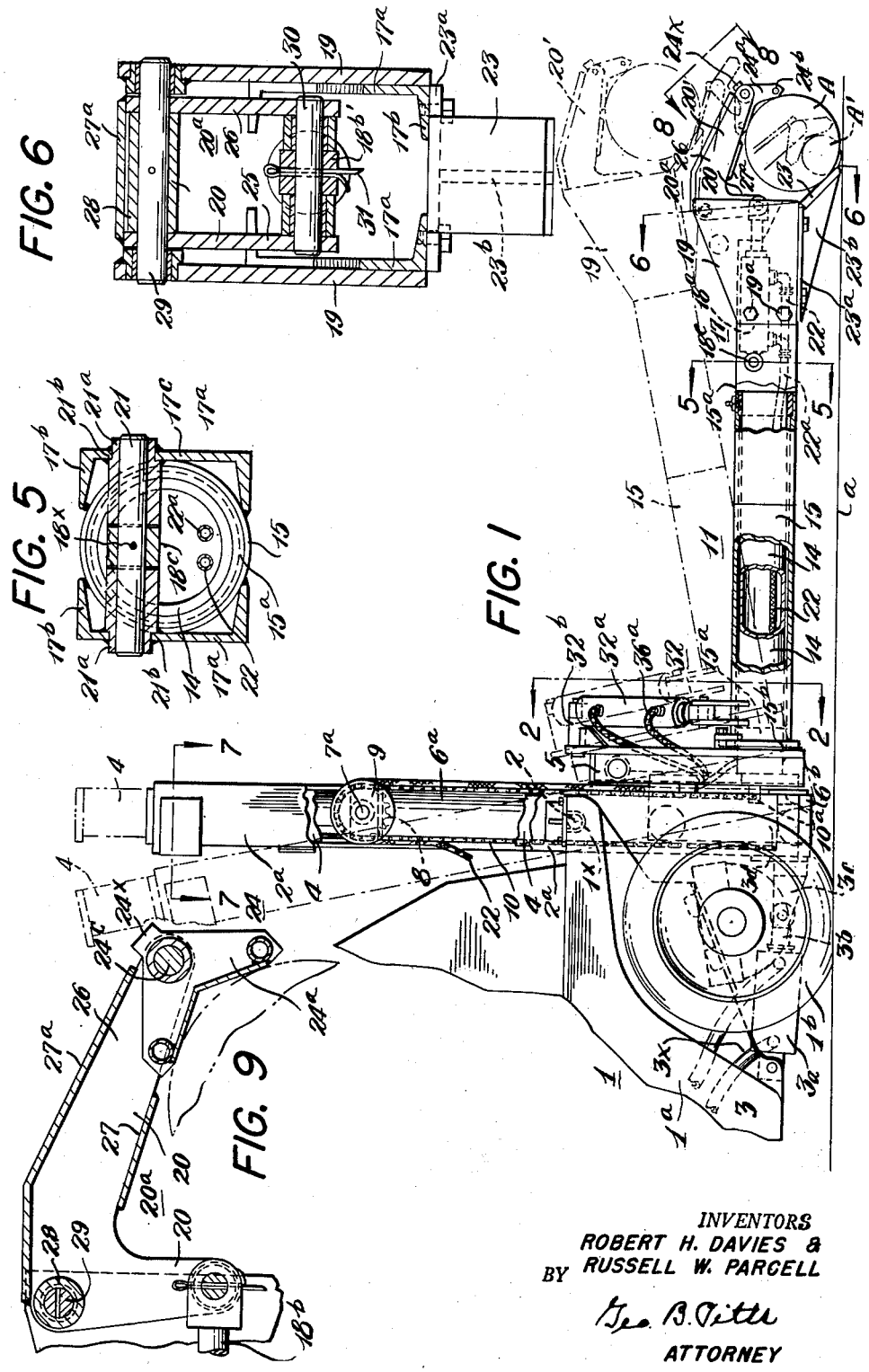
INVENTORS
ROBERT H. DAVIES &
RUSSELL W. PARCELL
BY
Geo. B. Tittle
ATTORNEY May 4, 1954    R. H. DAVIES ET AL    2,677,475
INDUSTRIAL TRUCK
Filed Sept. 20, 1951    3 Sheets-Sheet 2
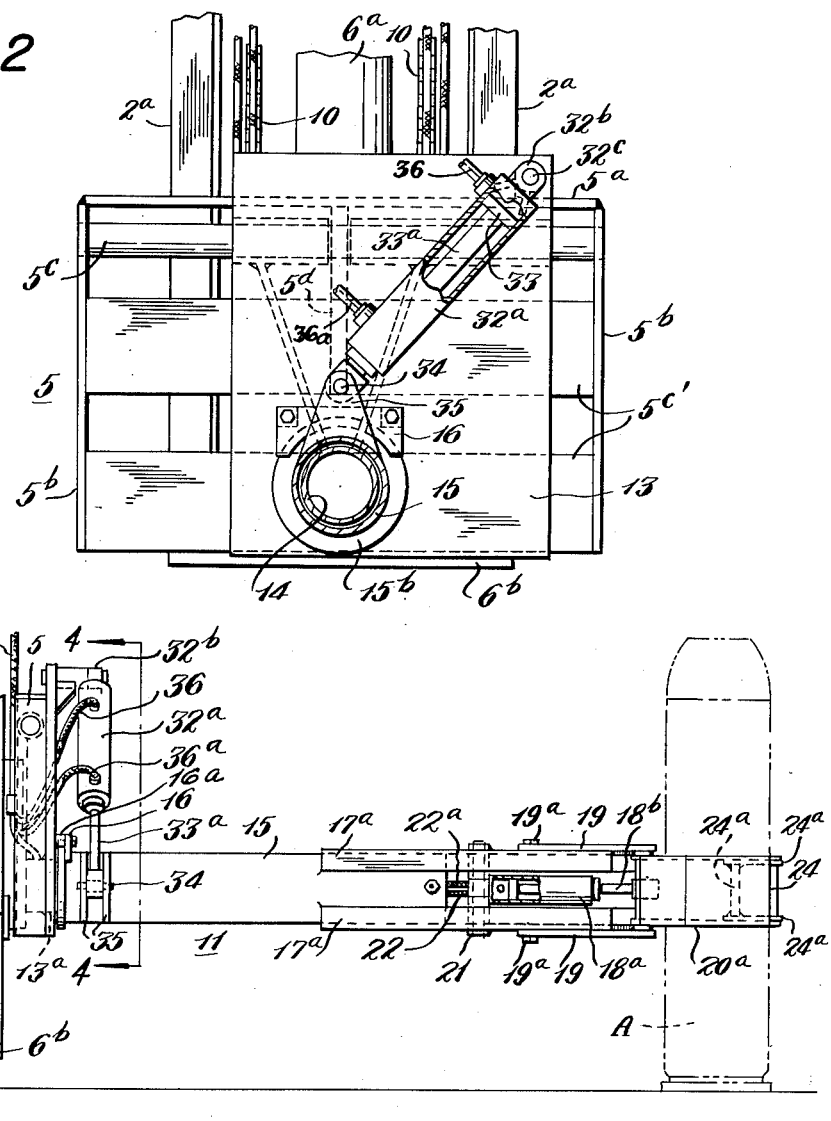
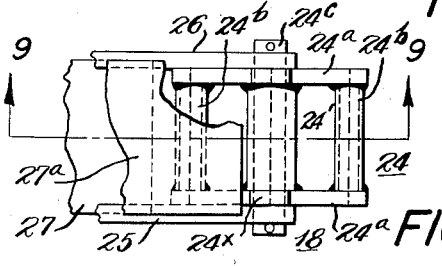
INVENTORS
ROBERT H. DAVIES &
BY RUSSELL W. PARCELL
ATTORNEY May 4, 1954 R. H. DAVIES ET AL 2,677,475
INDUSTRIAL TRUCK
Filed Sept. 20, 1951 3 Sheets-Sheet 3

INVENTORS
ROBERT H. DAVIES &
RUSSELL W. PARCELL
BY
Geo. B. Pitti
ATTORNEY

Patented May 4, 1954

2,677,475

UNITED STATES PATENT OFFICE 2,677,475

INDUSTRIAL TRUCK

Robert H. Davies, Shaker Heights, and Russell W. Parcell, Mantua, Ohio, assignors to The Baker-Raulang Company, Cleveland, Ohio, a corporation of Ohio Application September 20, 1951, Serial No. 247,482

5 Claims. (Cl. 214—652)

This invention relates to a truck having a support for an improved mechanism for engaging, supporting and handling a load, the support being movably mounted on the truck, whereby the load may be raised and lowered. The load engaging and supporting mechanism is, for purposes of illustration, removably mounted on the support and the latter in turn may be bodily moved rectilineally and/or bodily swung inwardly and outwardly, either or both movements serving to raise the load, whereby it may be positioned for inspection, processing and discharge. Preferably the truck is provided with guides for the support and the guides are trunnioned on the truck frame, the support being operable endwise of the guides by a suitable power operated mechanism and the guides being swingable by a separate power operated mechanism. In removably mounting the load engaging and supporting mechanism on the support it may be replaced by a different type of load engaging and supporting mechanism, whereby the truck may be employed to handle and transport different types of loads; but such removability is not intended to limit applicants' invention.

The invention disclosed herein includes power means for engaging and supporting a load or body, whereby it may be transported to a storage area or a station for inspection or processing, and separate power means for adjusting the load or body into a different position for various purposes such as inspection, processing or discharge. The processing may consist of machining or buffing the body, addition of fittings or other equipment thereto or (where the body is hollow) filling the body with material and equipment dependent upon the use to which it is to be put.

The invention includes load engaging means capable of engaging and picking up loads, when at rest on the floor or other surface, of various shapes in cross section, including cylinders, oval shaped bodies, of approximately cylindrical shape, and bodies of non-cylindrical shape but having a cross sectional shape which permits one of the load engaging members to engage the lower portion of each thereof within its outer contour.

One object of the invention is to provide, in a truck, an improved mechanism for engaging and handling a load, movable relative to the truck frame, whereby the latter may be positioned for inspection, processing and/or ready transportation.

Another object of the invention is to provide, in a truck having a raisable member, an improved mechanism for removably engaging a load and separate mechanism for bodily moving the load into a position for inspection and/or processing.

Another object of the invention is to provide, in a truck having a raisable member, improved means for engaging and picking up loads of varying shapes in cross section when at rest on the floor or other surface or otherwise supported.

Another object of the invention is to provide in a truck having a movably supported member, an improved mechanism for engaging loads consisting of a cylinder mounted at its inner end on the movable member and a tubular member rotatably fitting the cylinder and having (a) at its outer end power operated devices for clamping the load and (b) at its inner end connections with a separate power operated means for rotating the tubular member a predetermined distance, whereby inspection and/or processing of the load is facilitated, the respective power means being controlled by the operative on the truck.

Another object of the invention is to provide in a truck, having a raisable member, an improved mechanism on the latter for engaging bodies of different shapes in cross section and consisting of a fixed device and a power operated member provided with a trunnioned device adapted to engage bodies differing in size diametrically.

A further object of the invention is to provide, in a truck having a raisable member, a mechanism on the latter for engaging and lifting variously shaped bodies in cross section and consisting of a fixed abutment and a movable, power operated clamping member disposed above and outwardly of the abutment and arranged, when engaged with the body, to secure it on the abutment, whereby minimum power is required to maintain the clamping member in position.

Other objects of the invention will be apparent to those skilled in the art to which our invention relates from the following description taken in connection with the accompanying drawings, wherein Fig. 1 is a fragmentary side elevation showing the front end portion of an industrial truck having mounted thereon a load engaging and supporting mechanism embodying our invention, parts being broken away;

Fig. 2 is a section on the line 2—2 of Fig. 1;

Fig. 3 is a view similar to Fig. 1, but showing the load engaging and supporting mechanism in a different position;

Figure 4:
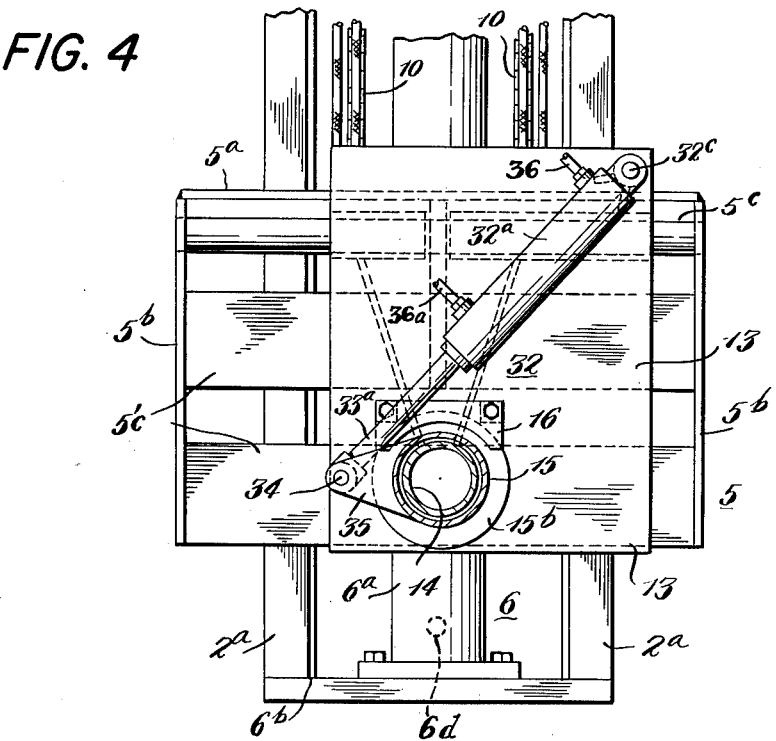
Fig. 4 is a section on the line 4—4 of Fig. 3.
Figure 7:
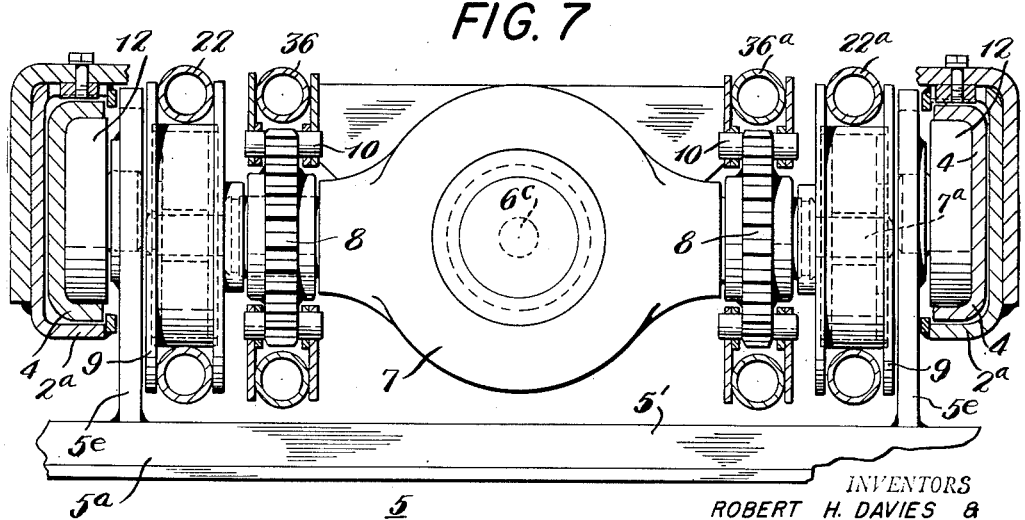

Figs. 5 and 6 are sections on the lines 5—5 and 6—6, respectively, of Fig. 1;

Fig. 7 is a section on the line 7—7 of Fig. 1, enlarged;

Fig. 8 is a fragmentary plan view on the line 8—8 of Fig. 1, parts being broken away; and Fig. 9 is a section on the line 9—9 of Fig. 8.

In the drawings, 1 indicates as an entirety the front end portion of an industrial truck having a frame 1a mounted on a pair of front wheels 1b and a pair of rear wheels (not shown), one of said pairs of wheels being driven and the other pair being steerably mounted. The front end of the frame 1a is provided with suitable bearings 1x to support trunnions 2 fixed to the outer sides of a pair of outer guides 2a, whereby, by operation of a suitable power means, indicated as an entirety at 3, the guides 2a and parts supported thereon may be tilted inwardly and outwardly, as shown in Fig. 1. The means for tilting the guides 2a are preferably of the fluid operated type and consist of a cylinder 3a having a reciprocatable piston. The piston is connected to and operates a rod 3b, the outer end of which is pivotally connected to an arm 3c fixedly secured to a crossplate 3d, the latter being suitably welded to the lower ends of the guides 2a. Fluid under pressure is supplied to either end of the cylinder through conduits 3x to operate the piston therein, whereby tilting of the guides inwardly and outwardly may be effected for purposes later set forth. The guides 2a slidably support a pair of inner guides 4, relative to which a support, indicated at 5 is moved vertically by suitable mechanism 6, preferably of the fluid operated type. In this latter form of raising mechanism it may consist of a cylinder 6a, the lower end of which is mounted midway the guides 2a on a base 6b, having suitable connections at its opposite ends with the guides 2a, and a piston (not shown) in the cylinder connected to a rod 6c, the upper end of the latter being connected to a cross-head 7. In this arrangement, fluid under pressure (such as oil) supplied to an inlet 6d for the cylinder 6a will operate the piston upwardly and raise the cross-head 7. The cross-head 7 is provided diametrically with laterally extending shafts 7a on each of which are mounted a sprocket 8 and a pulley 9; the purpose of the pulley will later appear. The sprockets 8 are engaged by chains 10 the inner portions of which extend downwardly and are suitably anchored, whereas their outer portions extend downwardly and are connected to brackets 10a on the rear side of the support 5. Accordingly, where the cross-head 7 is raised by supply of fluid to the cylinder 6a, the support 5 moves upwardly relative to the guides 4 and carries with it a load engaging and supporting mechanism indicated as an entirety at 11, to varying heights or levels. The construction of the truck frame, mounting of the wheels therefor, wheel driving mechanism, tilting power means 3, support 5 and raising mechanism 6 for the latter, are respectively well known in the art and therefore may be of any conventional or preferred form of construction. However, since other mechanisms hereinafter referred to are operated by fluid supplied under pressure, we prefer to operate the power means 3 and raising mechanism 6 in the same manner. The fluid supply under pressure for these mechanisms and other mechanisms later referred to is mounted on the frame 1a and includes a sump, a pump, a motor for driving the pump and one or more valve mechanisms operated by suitable levers to control the supply of fluid to these mechanisms, respectively, these parts and mechanisms being of well known forms of construction, for which reason they are not shown.

The support 5 comprises a frame 5' disposed transversely of the guides 2a and 4 and having a top bar 5a, side bars 5b, connected by a bar 5c and cross plates 5c' and a vertical rib 5d, these parts being rigidly connected together, as by welds. The frame 5' is provided with rearwardly extending spaced brackets 5e (see Fig. 7) the opposite outer sides of which support upper and lower rollers 12 which have rolling engagement with the side walls of the guides 4 to slidably support the support 5 thereon, as shown in Fig. 7.

The load carrier 11 consists of the following: 13 indicates a plate suitably removably fixed to the frame 5', preferably the top 5a and rib 5d thereof. The lower portion of the plate 13 is formed with a through opening 13a, the axis of which preferably intersects the axis of the cylinder 6a. 14 indicates a cylinder (preferably hollow from end to end) the inner end portion of which extends through the opening 13a and is welded to the marginal edges of the latter to rigidly connect the cylinder thereto. The cylinder 14 forms a shaft for a tubular member 15. The inner walls of the tubular member 15, adjacent its opposite ends, are recessed annularly to form seats for suitable bushings 15a rotatably fitting the cylinder 14. The inner end of the tubular member 15 is provided with a collar or flange 15b, which revolubly fits between and has movable engagement with opposed faces of the plate 13 and a wall 16 spacedly mounted on the latter. As shown in Figs. 1 and 3, the spacing of the wall 16 relative to the plate 13 is provided by blocks 16a disposed at the opposite upper ends of the plate, so that by means of cap screws 16b extending through the blocks and threaded into openings formed in the plate 13, the wall 16 and blocks are rigidly secured together and to the plate 13. As shown in Fig. 2, the wall 16 is elongated and the lower edge thereof is of arcuate shape to overlap the collar or flange 15b through a relatively long angular portion thereof, such overlapping relation of wall 16 with the collar or flange 15b serving to prevent movement of the tubular member 15 endwise outwardly, while permitting the latter to rotate as later set forth. The tubular member 15 is provided with an extension, indicated as an entirety at 17, which mounts at its outer end a clamping mechanism, indicated as an entirety at 18, for a body A herein shown for exemplification as a shell. The extension 17 preferably consists of a pair of channel bars 17a, the outer end portions of which extend outwardly of the tubular member 15, and plates 19 secured to the opposite outer sides of the channels 17a, inwardly of the outer ends of the latter, by spaced bolts 19a. The free edges of the side walls 17b of the channel bars 17a are welded to opposite sides of the tubular member 15, the welded edges of one bar and the welded edges of the other bar being so related that the webs 17c of the channel bars 17a are in parallel relation and therefore support the plates 19 in parallel relation.

The clamping mechanism 18 consists of the following: 18a indicates a cylinder having a reciprocatable piston connected to a piston rod 18b, which extends outwardly of the outer end of the cylinder 18a and is pivotally connected at its outer end to one arm 20 of a bell-crank 20a, fulcrumed mounted between the plates 19, as later set forth. The inner end of the cylinder 18a is provided with a knuckle 18c which is suitably fixed by a pin 18x to and intermediate the ends of a rock shaft 21 (see Fig. 5). The opposite end portions of the rock shaft 21 have bearing in elongated sleeves 21a, the outer ends of which extend through and are welded to the walls of openings 21b formed in the channel bar webs 17c, as shown in Fig. 5. As shown, the inner ends of the sleeves 21a engage the opposite sides of the knuckle 18c to maintain it in alinement with the axis of the cylinder 18a and as the knuckle 18c, through the pin 18x, is fixed to the shaft 21, the latter is held against endwise movement. The cylinder 18a is provided at its opposite ends with fluid connections connected to pipes 22, 22a, respectively, mounted as later set forth, and connected to one of the valve mechanisms on the frame 1a, as already set forth. As will be understood, when the adjacent valve mechanism is operated to one position the fluid flows through one pipe to the cylinder 18a at one side of the piston therein to move the latter in one direction and simultaneously fluid on the opposite side of the piston is discharged from the cylinder through the other pipe and when the adjacent valve mechanism is operated to its other position the fluid connections to the pipes 22, 22a, are reversed, the effect of which is to move the piston in the opposite direction. 23, 24, indicate relatively movable body engaging or clamping devices for the bodies to be handled and/or transported. The device 23 consists of a downwardly and outwardly inclined abutment integrally connected at its inner end to a rearwardly extending pad 23a which is rigidly secured (preferably removably by cap screws) to the adjacent side walls 17b of the channel bars 17a (see Fig. 6). The abutment 23 and pad 23a are reinforced by a gusset 23b. When a body A is to be picked up from the floor or other surface the support 5 is lowered or tilted outwardly to effect engagement of the abutment 23 with the surface on which the body rests (see Fig. 1). The device 24 consists of a frame fulcrumed on the outer end of the other bell crank arm 20' and operated by the latter into clamping engagement with the body A as shown in Fig. 1. The bell crank 20a preferably comprises spaced members each consisting of sections 25, 26, and bridge plates 27, 27a, welded thereto. A sleeve 28 is mounted between the sections 25 and 26 and the latter are formed with openings alined with the opening through the sleeve, whereby, by means of a shaft 29 extending through the sleeve 28, the alined openings and collars 25x mounted in openings formed in the plates 19, the bell crank 20a is fulcrumed on and between the latter. As shown in Figs. 1 and 6, the bridge plate 27, sections 25, 26, and sleeve are shown welded together with the latter pinned to the shaft 29, to form the bell crank 20a having a short arm 20 pivotally connected to the piston rod 18b and a long arm 20' which supports the clamping device 24. As shown in Fig. 6, the outer ends of the sections 25, 26, support the opposite ends of a rock shaft 30 which extends through the knuckle 18b' on the outer end of the piston rod 18b, the knuckle 18b' being secured to the rock shaft 30 by a cotter pin 31. The knuckle 18b' is held against lateral movement and in alinement with the axis of the cylinder 18a by spacers disposed between its opposite sides and the sections 25, 26. The clamping device 24 consists of a pair of V-shaped members 24a spaced in parallel relation by cross members 24b disposed between their respective adjacent outer ends and an intermediate hollow member 24' through which a shaft 24c extends, the opposite ends of the shaft being mounted in openings formed in the outer ends of the bell crank arm sections 25, 26, which form the long arm 20'. The members 24a are provided with upstanding lugs 24x which engage the outer end of the bridge plate 27a, when the bell crank is in its inoperative position (see dotted lines in Fig. 1), so that the clamping device 24 will be maintained in operative relation to a body A when the bell crank is operated to effect engagement of the device 24 with the body A. Fig. 1 shows the support 5 and carrier 11 in their lowest position with the abutment 23 in engagement with the travel surface a; the position in which a body A is picked up. In carrying out a pick-up operation the bell crank 20a is first rocked counterclockwise to the position shown in dotted lines in Fig. 1; next the truck is driven forwardly to effect engagement of the abutment 23 with the body; next, the bell crank is rocked in the opposite direction to move the clamping device 24 into pressure engagement with the body A with the latter clamped against the abutment 23; and finally the mechanism 6 is operated to raise the support to a selected level. The raising of the load may be for the purpose of inspection and/or processing or for transportation to a place of storage or where the inspection and/or processing is to be carried out. From the foregoing description, it will be observed that the load may be raised to a desired position by operating the tilting means 3, as shown in dotted lines in Fig. 1, or by raising the support 5 in the guides 4; or, if desired, the guides may be tilted inwardly and the support 5 raised. Also, as later set forth, the tubular member may be rotated to a predetermined position to facilitate inspection and processing of the body A.

From the foregoing description it will be observed that when the clamping devices 23, 24 engage a body A (or a smaller body A' shown in dotted lines in Fig. 1), an imaginary plane cutting the axes of the body A or A' and shaft 29 extends between the clamping devices 23, 24, whereas the opposite ends of the V-shaped members 24a engage the body A or A' at opposite sides of an imaginary plane cutting the point of engagement of the body with the abutment 23 and axis of the shaft 24c, so that the arms 24a cooperate with the abutment 23 to secure the body in position on the latter. By reason of the fact that the clamping device 24 is free to swing in one direction on the bell crank arm sections 25, 26, it accommodates itself to the surface of the body A or A' when the bell crank 20a is operated to clamp the latter.

Mechanism, indicated as an entirety at 32, is provided for rotating the tubular member 13, preferably 90 degrees, as shown in Fig. 3, whereby the body A may be inspected, processed, stacked on end in position to be filled, removed manually or mechanically or discharged to a conveyor. The mechanism 32 consists of the following: 32a indicates a cylinder the outer end wall of which is provided with a hollow boss 32b pivotally mounted on a stud shaft 32c suitably supported on the plate 13. The cylinder 32a is provided with a reciprocatable piston 33 connected to a piston rod 33a. The outer end of the rod 33a is pivotally connected to a pin 34, which is supported at its opposite ends in the outer end portions of a pair of parallel plates 35, 35 (forming a crank), suitably fixed to and extending radially from the tubular member 15. The opposite end portions of the cylinder 32a are provided with fluid connections to which pipes 36, 36a, are connected, the pipes leading to a valve mechanism on the frame 1a, as already set forth, the operation of the valve mechanism serving to reciprocate the piston 33 in a well known manner. By preference, the plates 35, 35, are disposed vertically and the piston 33 is at the outer end of the cylinder 32a, when the clamping devices 23, 24, are in the body pick-up position; accordingly, operation of the piston to the inner end of the cylinder 32a rotates the tubular member, clamping devices 23, 24, and body A to the position shown in Fig. 3.

The pipes 22, 22a, consist of flexible hose which extend through the hollow cylinder 14 and a lateral opening formed therein on the inner side of the plate 13 and are suitably secured by yokes to the inner side of the upper cross plate 5c', from which the hose extend upwardly and reeve on the pulleys 9 during raising and lowering of the support 5, being guided upwardly and downwardly by the flanges on the pulleys. Also, the pipes 36, 36a, consist of flexible hose which are extended around the upper cross plate 5c' and secured by yokes to the inner side thereof and then extend to and fit between the extended side bars of the chains 10 and reeve therewith around the sprockets 8. From the sprockets 8 and pulleys 9, the hose extend rearwardly (see Fig. 1) for connections with their respective valve mechanisms.

From the foregoing description it will be observed that the load engaging and clamping devices 23, 24, are operable to engage and pick up a body when the latter is at rest on its side on a floor or other surface. Also, since the clamping mechanism is movable upwardly and rotatably, the body engaged thereby may be disposed in different positions for inspection, processing or discharge. The mechanism adapts itself to handling shells; for example, a shell may be picked up as shown in Fig. 1, then raised and bodily rotated and finally lowered and positioned uprightly on the floor, as shown in Fig. 3; in this latter position materials and essential devices can be applied interiorly of the shell.

It will also be noted that the clamping devices are so related that simplified power means may be provided; as shown, the device 23 is rigidly mounted on the channel members 17a inwardly of the device 24 and inwardly of and below the center of gravity of the body to be engaged, whereas the device 24 is disposed above and outwardly of the center of gravity of the body to be engaged and swings about an axis disposed above and inwardly of the center of gravity of the body and thereby in co-operation with the device 23 prevents outward movement of the body without employment of undue clamping pressure.

To those skilled in the art to which our invention relates many changes in construction and widely differing embodiments and applications of the invention will be apparent without departing from the scope of the invention. The description and disclosures herein are merely illustrative and not intended to be limiting.

What we claim is:

1. An apparatus of the class described having, in combination, a frame, substantially vertical guides thereon, a support slidably mounted on said guides, hydraulically operated means for raising said support, including cylinder-piston elements, said piston element having a cross-head provided at opposite sides thereof with laterally extending shafts, a sprocket loosely mounted on each shaft, chains engaging said sprockets and connected to said support to raise the latter, a cylinder secured at its inner end to said support and extending outwardly therefrom, a tubular member rotatably mounted on said cylinder, an abutment fixedly mounted on the outer end of said tubular member, a device movably mounted on the outer end of said tubular member in diametrical relation to said abutment for engaging a load and arranged to co-operate with said abutment to secure the load on said tubular member, cylinder-piston elements on said tubular member for operating said device toward and from the load, cylinder-piston elements mounted on said support and connected to said tubular member for rotating it a predetermined distance, a source of supply of fluid under pressure, valve controlled fluid connections between said source of fluid supply and the opposite ends of each of said cylinder elements, portions of said connections consisting of flexible conduits, and means for supporting said flexible conduits to take up slack therein during raising and lowering of said support, said supporting means including extension plates on the links of each chain arranged to mount one of said conduits thereon for reeving the latter around the adjacent sprocket and a pulley loosely mounted on each of said shafts arranged to support one of the remaining conduits and permit reeving thereof on said pulley during raising and lowering of said support.

2. An apparatus of the class described, having, in combination, a frame, guides mounted on said frame, a support slidably mounted on said guides, hydraulically operated means for raising said support, including cylinder-piston elements, said piston element having a cross-head provided at opposite sides thereof with laterally extending shafts, a sprocket on each shaft, chains engaging said sprockets and connected to said support to raise the latter, a hollow cylinder secured at its inner end to said support and extending outwardly therefrom, a tubular member rotatably mounted on said cylinder, an abutment mounted on the outer end of said tubular member, a device movably mounted on the outer end of said tubular member for engaging a load and cooperating with said abutment to secure the load on said tubular member, cylinder-piston elements for operating said device toward and from the load, cylinder-piston elements mounted on said support and connected to said tubular member for rotating it a predetermined distance, separate means for supplying fluid under pressure to each of said cylinder elements, said hollow cylinder being arranged to enclose the adjacent portions of the fluid supply means leading to said first mentioned cylinder element, each of said supply means including flexible conduits, and means for supporting said flexible conduits to take up slack therein during raising and lowering of said elevating member, said means including extension plates on the links of each chain arranged to mount one of said conduits thereon for reeving around the adjacent sprocket and a pulley on each of said shafts arranged to support one of the remaining conduits and permit reeving thereof on said pulley during raising and lowering of said elevating member.

3. In apparatus of the class described, the combination with a wheel mounted frame, a vertically disposed frame consisting of spaced guide means trunnioned on said first mentioned frame for tilting motion relative thereto, a support slidably mounted on said guide means and means for raising said support on said guide means, of a mechanism for engaging and supporting a load on said support, said mechanism consisting of a horizontally disposed elongated shaft secured at its inner end on said support and extending outwardly therefrom, a tubular member substantially co-extensive in length to said shaft and rotatably mounted thereon, an endwise related extension secured to the outer end of said tubular member, spaced load engaging devices on the outer end of said extension, one of said devices consisting of a fixed abutment the outer end of which is adapted to engage the surface on which a load is positioned when a load thereon is to be picked up, the other device comprising a member swingably mounted on said extension and a load engaging element trunnioned on a transverse axis on the outer end of said swingably mounted member, the opposite ends of said element being adapted to engage the load at opposite sides of an imaginary plane cutting the axis of the load and point of contact of the latter with said abutment, hydraulically operated means for operating said swingably mounted member in opposite directions and separate hydraulically operated means for rotating said tubular member in opposite directions.

4. In apparatus of the class described, the combination with a wheel mounted frame, vertically disposed spaced guides mounted on said frame, a support slidably mounted on said guides and means for raising said support on said guides, of a mechanism for engaging and supporting a load on said support, said mechanism consisting of an outwardly extending hollow shaft fixedly secured at its inner end to said support for movement therewith, a hollow member rotatably mounted on said shaft and provided at its outer end with an extension in endwise relation thereto, spaced load engaging devices on the outer end of said extension, one of said devices consisting of a fixed abutment the outer end of which is adapted to engage the surface on which a load is positioned when a load thereon is to be picked up, the other device being pivotally mounted on said extension and adapted to engage the load substantially diametrically thereof relative to said abutment, power means on said extension for operating said pivotally mounted device in opposite directions, and power means for rotating said hollow member a predetermined angular distance, said power means for operating said pivotally mounted load engaging device comprising cylinder-piston elements, and fluid pressure supply means having a valve controlled fluid connection leading through said hollow shaft and connected to the opposite ends of said cylinder element.

5. An apparatus as claimed in claim 4 wherein said guides are trunnioned on said frame.

References Cited in the file of this patent

UNITED STATES PATENTS

| Number | Name | Date |
|---|---|---|
| 853,482 | Taylor | May 14, 1907 |
| 2,432,411 | Guerin et al. | Dec. 9, 1947 |
| 2,507,583 | Wellman | May 16, 1950 |
| 2,522,128 | Lehmann | Sept. 12, 1950 |
| 2,578,070 | Jones | Dec. 11, 1951 |
| 2,596,477 | Frischmann et al. | May 13, 1952 |
| 2,611,498 | Broersma | Sept. 23, 1952 |